(12) United States Patent
Henderson et al.

(10) Patent No.: US 6,278,831 B1
(45) Date of Patent: Aug. 21, 2001

(54) FIBER OPTIC CABLE ASSEMBLY

(75) Inventors: Blaine Henderson; Kenton Frith, both of Winnipeg (CA)

(73) Assignee: Priority Electronics Inc., Winnipeg (CA)

( * ) Notice: Subject to any disclaimer, the term of this patent is extended or adjusted under 35 U.S.C. 154(b) by 0 days.

(21) Appl. No.: 09/479,124

(22) Filed: Jan. 7, 2000

Related U.S. Application Data

(60) Provisional application No. 60/115,348, filed on Jan. 8, 1999.

(51) Int. Cl.[7] .................................................. G02B 6/00

(52) U.S. Cl. ........................ 385/139; 385/100; 385/103

(58) Field of Search ..................................... 385/134–139, 385/94–99, 100–114

(56) References Cited

U.S. PATENT DOCUMENTS

| 5,231,688 | 7/1993 | Zimmer | 385/139 |
|---|---|---|---|
| 5,838,861 | * 11/1998 | Bunde | 385/100 |
| 5,903,693 | 5/1999 | Brown | 385/100 |
| 5,970,195 | 10/1999 | Brown | 385/100 |

* cited by examiner

Primary Examiner—Phan T. H. Palmer
(74) Attorney, Agent, or Firm—Pearne & Gordon LLP

(57) ABSTRACT

A furcation kit and method of manufacturing a furcated fiber optic cable are described. The furcation kit includes a molded furcation body and a molded furcation plug that is received in a hollow end of the furcation body. A stop prevents the plug from being inserted too far into the furcation body. A crimp ring is used to attach the furcation body to the furcated fiber optic cable. The advantages include a simple furcation kit that is easy to assemble, inhibits the formation of bends in furcated fiber optic strands, and occupies very little space.

23 Claims, 2 Drawing Sheets

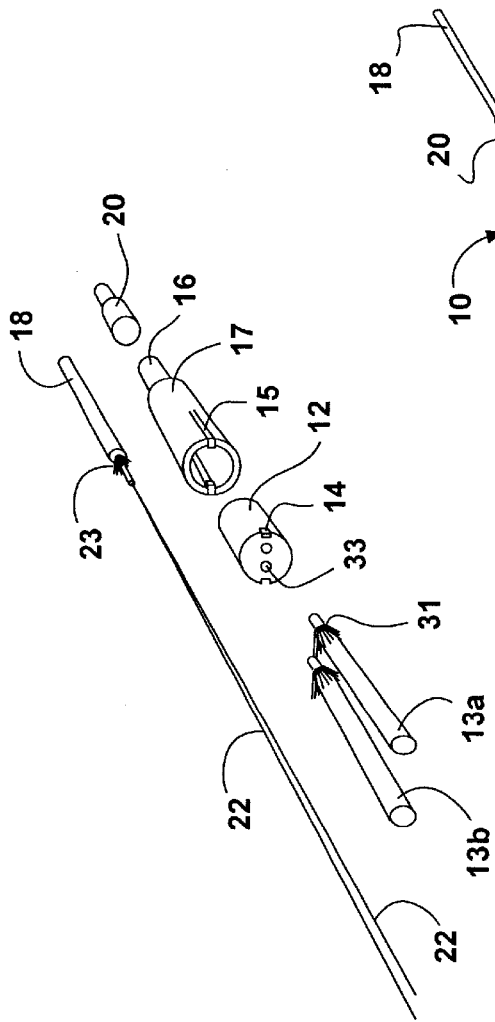
FIG. 1
FIG. 2
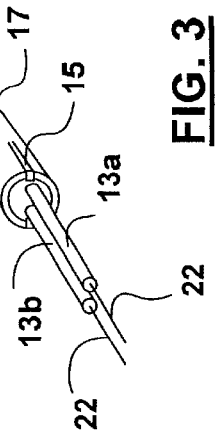
FIG. 3
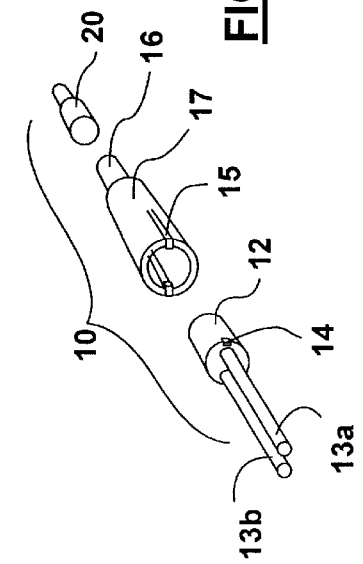
FIG. 5
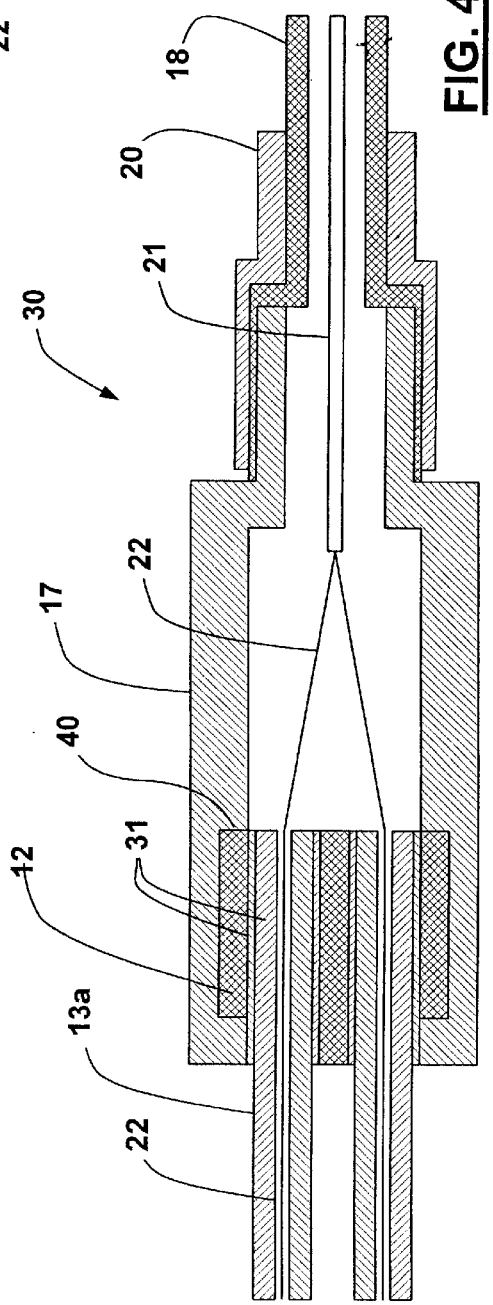
FIG. 4

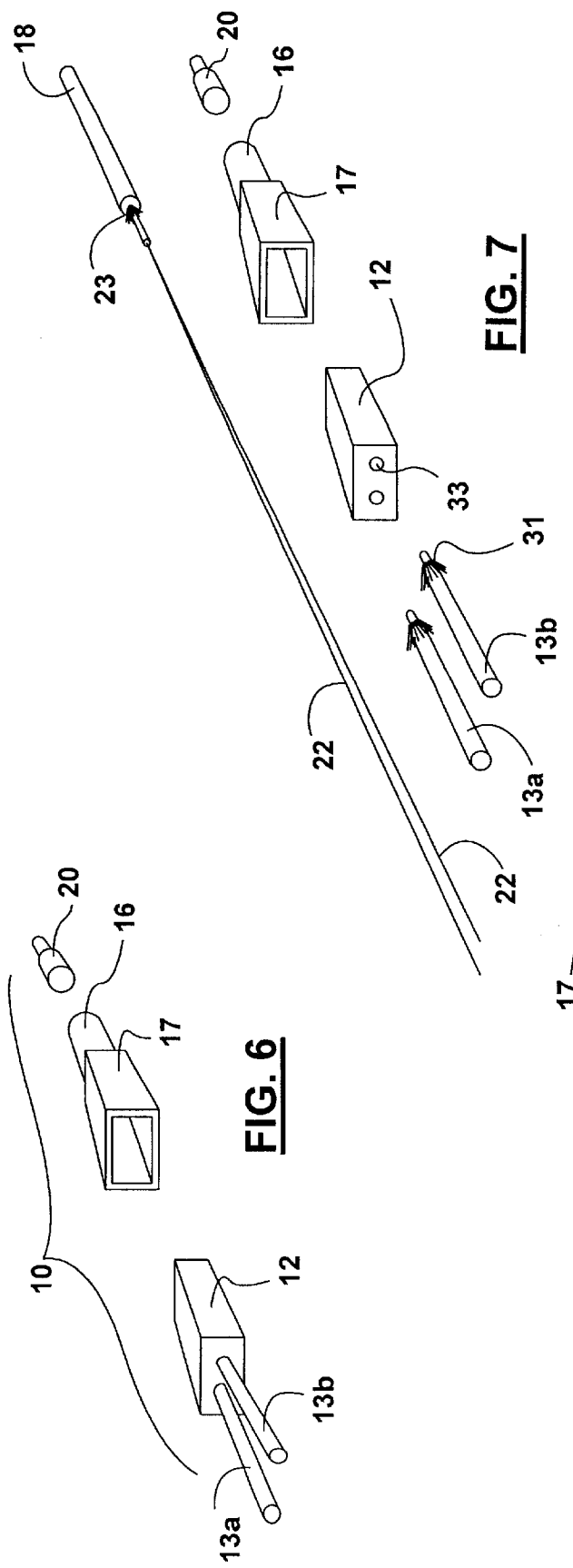
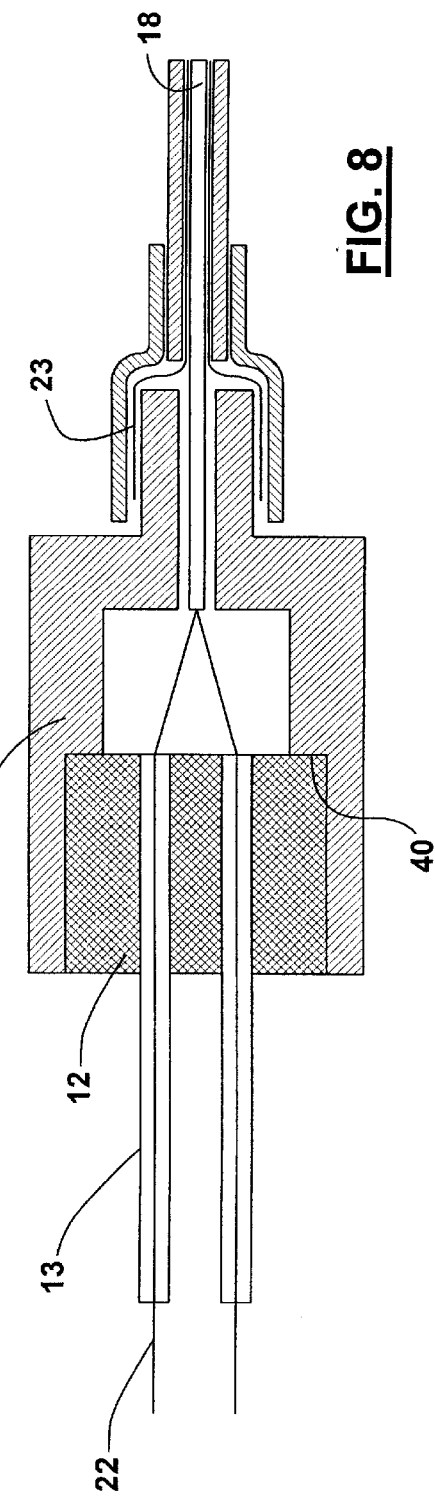

FIBER OPTIC CABLE ASSEMBLY

CROSS-REFERENCE TO RELATED APPLICATIONS

This application claims the benefit of priority under Title 35, U.S.C. §120 to U.S. patent application Ser. No. 60/115,348 filed Jan. 8, 1999.

FIELD OF THE INVENTION

This invention relates generally to fiber optic cable assemblies and, in particular, to a furcation kit for fiber optic cables.

BACKGROUND OF THE INVENTION

Fiber optic transmission systems have been in commercial use for over 20 years. Fiber optic cable provides many performance advantages over commercial metallic copper-based wire. These advantages make optical fiber the most advanced transmission medium available today, offering a low-cost alternative to satellite systems for international communications. Optical fiber is also well suited to supporting emerging applications such as interactive multimedia services delivered to the home.

Fiber optic cables bundle and protect fiber optic strands which are generally manufactured from glass. The number of fiber optic strands in a cable is variable. One popular fiber optic cable construction is duplex fiber optic cable. Duplex fiber optic cable is generally of two types: 1) round, and 2) zip. Round duplex fiber optic cable generally sheathes two 900 $\mu$m buffer coated 125 $\mu$m fiber optic strands contained within an outer PVC coating with an overall total diameter of 3.6 mm. Zip duplex fiber optic cable typically include two 2.5 mm outer diameter PVC fiber optic cables joined by a narrow PVC bridge. Each 2.5 mm outer diameter PVC cable sheathes a separate 900 $\mu$m coated fiber optic strand with an overall total diameter of 5.3 mm.

The round duplex fiber optic cable requires a "breakout" or "furcation" kit in order to attach connectors to the individual fibers. The furcation kit reduces the probability of introducing "microbends", which are sharp changes in direction in the connectorized fiber optic strands. Microbends are known to cause attenuation of light signals carried by the fiber strands.

Furcation kits for terminating fiber optic cables of various types are known in the art. For example, U.S. Pat. No. 5,231,688 which issued Jul. 27, 1992 to Zimmer teaches a furcation kit for a multiple optical cable. The cable end is secured by a mechanical compression fitting and optical fibers are routed into one or more plugs, each having a plurality of single optical fiber passages. A protective shell is mechanically secured around the area of furcation. The kit eliminates the need for adhesives and capsulants and thereby decreases the time required for installation.

U.S. Pat. Nos. 5,903,693 and 5,970,195 to Brown which issued respectively on May 11 and Oct. 19, 1999 describe a fiber optic cable furcation unit. The furcation unit has an outer heat shrink tube which encloses a protective sleeve. A spacer/fiber guide is located within the protective sleeve along with a sealant material. The furcation unit is designed expressly for loose tube fiber optic cables or tube ducts within Air Blown Fiber (ABF) cables to be furcated into multiple sheathed single fiber strands.

While the furcation kits known in the prior art have merit, they suffer from the disadvantage of being bulky and/or difficult to install without introducing microbends to the fiber strands. The furcation kit to Zimmer, for example, is generally too bulky for most indoor applications where limited space is available inside a patch cord panel or a patch cord tray. The furcation unit to Brown must be very carefully installed to avoid microbends in the fiber strands. Furthermore, the heat-shrink outer tube utilized to hold the furcation sleeve in the correct position does not stabilize the cable prior to heat treatment, and the heat exposure required to shrink the protective tube has potential for damaging the cable sheath and/or the fiber optic strands. Any damage induced in the fiber optic strands may result in increased signal attenuation.

Another furcation kit known in the art uses epoxy adhesives to secure a furcation tubing in place. Such furcation kits require significant curing times. Although curing can be accelerated by the application of heat, relatively long curing times are still required. Consequently, the assembly must remain isolated from outside influence that may cause a change in position of the furcation tubing or the fiber optic strands prior to the epoxy resin becoming adequately cured to support the components.

A need therefore exists for a simple furcation kit that is inexpensive to manufacture, easy to assemble, and occupies minimal space.

SUMMARY OF THE INVENTION

It is an object of the invention to provide a furcation kit for a fiber optic cable that is easy to install and substantially eliminates a probability of introducing bends in the fiber strands during installation.

It is a further object of the invention to provide a furcation kit that occupies less space than prior art furcation kits.

The invention therefore provides a furcation kit for a fiber optic cable comprising a furcation body having a first hollow end for receiving an end of the fiber optic cable and a second hollow end for receiving a furcation plug. The furcation plug has a first end received in the furcation body and a second end having at least one passage that extends through the furcation plug, the at least one passage being adapted to receive and retain a furcation tube. The furcation kit further includes means for attaching the fiber optic cable to the second hollow end of the furcation body.

In accordance with a preferred embodiment of the invention, the means for attaching the fiber optic cable to the second hollow end of the furcation body comprises a crimp ring. The second hollow end of the furcation body includes a cylindrical backbone having a hollow interior sized to accept a stripped end of the fiber optic cable. An outer surface of the cylindrical backbone is sized to permit a fanned-out end of a strength member of the fiber optic cable to be overlaid on the backbone. The crimp ring is crimped over the fanned-out end of the strength member to attach the fiber optic cable to the furcation body. An adhesive may be applied between the fanned-out end of the strength member and the backbone before the crimp ring is crimped.

The furcation plug may be retained within the furcation body by clip members biased to engage notches in the second end of the furcation plug. Alternatively, the furcation plug may be retained within the furcation body by an adhesive.

The furcation body preferably includes a stop means for preventing the furcation plug from being inserted too far within the second end of the furcation body. This inhibits the formation of microbends in fiber optic strands pulled through the at least one furcation tube retained in the furcation plug.

The furcation body may be over-molded with a thermoplastic resin after the furcation plug is inserted in the furcation body.

The invention also provides a method of manufacturing a fiber optic cable having a furcated end. In accordance with the method, a crimp ring is placed over an end of the fiber optic cable and moved away from the end of the fiber optic cable. A cable sheath is stripped from the end of the fiber optic cable to expose a predetermined length of strength member and a buffer tube that surrounds at least one fiber optic strand. The strength member and the buffer tube are cut off a predetermined distance from an end of the cable sheath to expose a predetermined length of the at least one fiber optic strand. The cut end of the strength member is fanned-out and a backbone of the furcation body is slid over the cut end of the buffer tube. The fanned-out strength member is compressed over an outer surface of the backbone of the furcation body and the crimp ring is slid over the backbone and crimped to trap the fanned-out end of the strength member between the crimp ring and the backbone. Free ends of the at least one fiber optic strand are inserted into furcation tubes of the furcation plug, and the furcation plug is inserted into the end of the furcation body.

BRIEF DESCRIPTION OF THE DRAWINGS

FIG. 1 is a perspective view of a furcation body in accordance with a first of the embodiment of the invention;

FIG. 2 is a perspective view of a furcation plug in accordance with the first embodiment of the invention;

FIG. 3 is a perspective view of an assembled furcation kit in accordance with the first embodiment of the invention;

FIG. 4 is an enlarged longitudinal cross-sectional view of the furcation kit shown in FIG. 2;

FIG. 5 is an exploded view of the furcation kit components and a fiber optic cable illustrating how the fiber optic cable is stripped prior to installation of the furcation kit shown in FIGS. 1–4;

FIG. 6 is a perspective view of a furcation kit in accordance with a second embodiment of the invention;

FIG. 7 is an exploded view of the furcation kit components and a fiber optic cable illustrating how the fiber optic cable is stripped prior to installation of the furcation kit; and FIG. 8 is an enlarged longitudinal cross-sectional view of the furcation kit shown in FIGS. 7 and 8 in an assembled condition.

DETAILED DESCRIPTION OF THE PREFERRED EMBODIMENTS

FIGS. 1 and 2 show a perspective view of a furcation kit in accordance with the invention generally indicated by reference numeral 10. The furcation kit includes a furcation body 17 and a furcation plug 12. The furcation body 17 and the furcation plug 12 are each preferably injection molded from a suitable thermoplastic. A crimp ring 20 is preferably constructed from a light metal such as aluminum. Such crimp rings are commercially available in a variety of diameters for various diameters of fiber optic cable 18. The crimp ring 20 forms a part of the furcation kit 10. Attached to and extending from the furcation plug 12 are a pair of furcation tubes 13a, 13b. As will be understood by those skilled in the art, the number of furcation tubes 13 depends on the number of fiber optic strands in the fiber optic cable 18. The furcation tubes 13 are commonly made of the same material as the fiber optic cable 18. The furcation tubes 13 are hollow and sized to accommodate a single fiber optic strand 22 (FIG. 3).

As shown in FIG. 5, the furcation tubes 13a, 13b are attached to the furcation plug 12 prior to assembly of the furcation kit. Preferably, about 9 mm of an outer sheath (typically a PVC coating) is removed from an end of the furcation tubes 13a, 13b to expose a strength member 31 (typically a Kevlar® fabric sheath). The Kevlar® strength member is tanned-out around the furcation tubes 13a,b and an adhesive is applied. The adhesive is preferably a two-part epoxy adhesive, such as 3M DP-420®. The furcation tubes 13a, 13b are then inserted into the furcation plug 12 until an end of each tube aligns with an inner end of the furcation plug (see FIG. 4). When the furcation tubes 13a, 13b are inserted into the furcation plug 12, the fanned portion of the strength member 31 is folded back over the outer sheath of each furcation tube and trapped between an inner surface of passages 33 in the furcation plug 12 and the outer sheath of the furcation tubes 13a, 13b. The furcation tubes 13a, 13b may be cut to any desired length depending upon the requirements of the desired breakout.

Prior to installation of the furcation kit on the fiber optic cable 18, the crimp ring 20 is slid onto the fiber optic cable 18. A predetermined length of the outer sheath of the fiber optic cable 18 is stripped from the cable. The predetermined length is dependent on the length of the furcation tubes 13a and 13b. When in an assembled condition, the fiber optic strands 22 should extend from respective ends of the furcation tubes 13a, 13b as shown in FIG. 3. After the outer sheath of the fiber optic cable is removed, the strength mender 23 is preferably cut back to a length of about 6.5 mm from the end of the sheath member. A buffer tube 21 which surrounds and protects the fiber strands is preferably stripped from about 7 mm from the end of the outer sheath of the fiber optic cable 18. This leaves exposed a desired breakout length of the fiber optic strands 22, which is typically a length of at least about 15 cm.

Thereafter, the Kevlar® strength member 23 is fanned-out as shown in FIG. 5 The fiber optic strands 22 are then inserted through a passage in the backbone 16 of the furcation body 17 and the backbone is slid over the buffer tube 21 until a rear end of the backbone 16 abuts the end of the outer sheath of the fiber optic cable 18. The fanned-out strength member 23 is compressed around the backbone 16 and the crimp ring 20 is slid over the backbone 16 and crimped to trap the strength member 23 between the backbone 16 and the crimp ring 20, An appropriate crimping tool is used for this operation. The two optic fiber strands 22 are gently inserted into the inner end of furcation plug 12 and the furcation plug 12 is slid down the fibers and gently inserted into the furcation body 17 until clips 15 on opposite sides of the furcation body 17 engage notches 14 on the outer end of the furcation plug 12. The assembled furcation kit may then be overmolded using an injection molding device (not shown), preferably utilizing a low heat thermoplastic elastomer, such as polyvinyl chloride (PVC), for example. The furcated fiber optic cable is then ready for application of suitable fiber optic connectors and testing.

FIG. 6 is a perspective view of a second embodiment of the invention. The furcation kit 10 shown in FIG. 6 is identical to that shown in FIGS. 1–5 with the exception that the furcation body 17 and the furcation plug 12 are rectangular in cross-section rather than circular in cross-section, and the furcation plug 12 is retained in the furcation body 17 by an adhesive rather than by clips 15 shown in FIGS. 1–5. The preferred adhesive for retaining the furcation plug 12 shown in FIG. 6 within the furcation body 17 is a cyanoacrylate.

A common disadvantage in prior art furcation kits is that no mechanism was provided to inhibit the formation of bends in the fiber optic strands 22. As is well understood in the art, bends in the fiber optic strands 22 can cause attenuation of light signals transported by the fiber optic strands. Consequently, the furcation bodies 17 of the embodiments shown in FIGS. 4 and 8 include a stop 40 to ensure that the furcation plug 12 cannot be inserted into the furcation body 17 beyond a predetermined limit, Thus improper assembly of the furcation kits in accordance with the invention is prevented.

While the invention has been described with respect to dual strand fiber optic cable, it should be understood that it is not limited to use with dual strand fiber optic cable. The invention is adapted to be used with other types of fiber optic cable including one or more fiber optic strands.

The embodiments of the invention described above are intended to be exemplary only. The scope of the invention is therefore intended to be limited solely by the scope of the appended claims.

We claim:

1. A furcation kit for a fiber optic cable, comprising:
   a) a furcation body having a first hollow end for receiving an end of the fiber optic cable and a second hollow end for receiving a furcation plug;
   b) the furcation plug having a first end received in the furcation body and a second end having at least one passage that extends through the furcation plug, the at least one passage being adapted to receive and retain a furcation tube; and
   c) means for attaching the fiber optic cable to the first hollow end of the furcation body.

2. A furcation kit as claimed in claim 1 wherein the means for attaching the fiber optic cable to the first hollow end of the furcation body comprises a crimp ring.

3. A furcation kit as claimed in claim 2 wherein the first hollow end of the furcation body includes a cylindrical backbone having a hollow interior sized to accept a stripped end of the fiber optic cable.

4. A furcation kit as claimed in claim 3 wherein an outer surface of the cylindrical backbone is sized to permit a fanned-out end of a strength member of the fiber optic cable to be overlaid thereon.

5. A furcation kit as claimed in claim 4 wherein the crimp ring is crimped over the fanned-out end of the strength mender to attach the fiber optic cable to the furcation body.

6. A furcation kit as claimed in claim 5 wherein adhesive is applied between the fanned-out end of the strength member and the backbone before the crimp ring is crimped.

7. A furcation kit as claimed in claim 1 wherein the furcation plug is retained within the furcation body by at least two clip members biased to engage notches in the second end of the furcation plug.

8. A furcation kit as claimed in claim 1 wherein the furcation plug is retained within the furcation body by an adhesive.

9. A furcation kit as claimed in claim 8 wherein the adhesive is a cyanoacrylate.

10. A furcation kit as claimed in claim 9 wherein the furcation body is over-molded with a thermoplastic resin after the furcation plug is retained in the furcation body.

11. A furcation kit as claimed in claim 9 wherein the furcation body is over-molded with a thermoplastic resin after the furcation plug is retained in the furcation body.

12. A furcation kit as claimed in claim 8 wherein the furcation body is over-molded with a thermoplastic resin after the furcation plug is retained in the furcation body.

13. A furcation kit as claimed in claim 12 wherein the adhesive is a two-part epoxy resin.

14. A furcation kit as claimed in claim 1 wherein the furcation body includes a stop means for preventing the furcation plug from being inserted within the second end of the furcation body too far, in order to inhibit the formation of micro-bends in fiber optic strands pulled through the at least one furcation tube retained in the furcation plug.

15. A method of manufacturing a fiber optic cable having a furcated end, comprising steps of:
   a) placing a crimp ring over an end of the fiber optic cable and moving the crimp ring away from the end of the fiber optic cable;
   b) stripping a cable sheath from the end of the fiber optic cable to expose a predetermined length of a strength member and a buffer tube that surrounds at least one fiber optic strand;
   c) cutting off the strength member and the buffer tube a predetermined distance from an end of the cable sheath to expose a predetermined length of the at least one fiber optic strand;
   d) fanning out the cut end of the strength member;
   e) sliding a backbone of a furcation body over the cut end of the buffer tube and compressing the fanned-out end of the strength member over an outer surface of the backbone;
   f) sliding the crimp ring over the backbone and crimping the crimp ring to trap the fanned-out end of the strength member between the crimp ring and the backbone;
   g) inserting free ends of the at least one fiber optic strand into furcation tubes of a furcation plug; and
   h) inserting the furcation plug into a second end of the furcation body.

16. A method as claimed in claim 15 wherein prior to inserting the furcation plug into the furcation body, the furcation plug is prepared in a process comprising the steps of:
   a) preparing, for each passage in the furcation plug, a furcation tube by cutting a predetermined length of a sheath member from an end of the furcation tube;
   b) fanning out a strength member beneath the cut-off sheath member and folding the fanned-out strength member back over an end of the sheath member of the tube;
   c) covering the fanned-out strength member with an adhesive; and
   d) inserting the furcation tube into a passage in the furcation plug.

17. The method as claimed in claim 16 wherein the adhesive is a two-part epoxy resin.

18. The method as claimed in claim 15 further comprising a step of applying an adhesive to an exterior surface of the furcation plug before inserting the furcation plug into the furcation body.

19. The method as claimed in claim 18 wherein the adhesive is a cyanoacrylate.

20. The method as claimed in claim 15 wherein the furcation body is over-molded with a thermoplastic resin after step (h).

21. A furcation kit for a two-strand fiber optic cable in which both strands are enclosed by a single buffer tube, comprising:

a) a furcation body having a first hollow end for receiving an end of the single buffer tube and a second hollow end for receiving a furcation plug;

b) the furcation plug having a First end received in the furcation body and a second end having two passages that extend through the furcation plug, each of the two passages being adapted to receive and retain a furcation tube through which the respective fiber optic strands are threaded before the furcation plug is inserted in the furcation body; and c) a crimp ring for attaching the fiber optic cable to the second hollow end of the furcation body.

22. A furcation kit as claimed in claim 21 wherein the buffer tube has a diameter of 900 μm and the fiber optic strands each have a diameter of 250 μm.

23. A furcation kit as claimed in claim 21 wherein the crimp ring attaches the fiber optic cable to the furcation body by compressing a fanned-out strength member of the fiber optic cable against the first hollow end of the furcation body.

* * * * *

UNITED STATES PATENT AND TRADEMARK OFFICE
CERTIFICATE OF CORRECTION

PATENT NO.        : 6,278,831 B1                                     Page 1 of 1
APPLICATION NO.   : 09/479124
DATED             : August 21, 2001
INVENTOR(S)       : Blaine Henderson and Kenton Frith It is certified that error appears in the above-identified patent and that said Letters Patent is hereby corrected as shown below:

Column 4, line 7, delete "tanned-out" and insert therefor --fanned-out--.

Column 4, line 29, delete "mender" and insert therefor --member--.

Column 5, Claim 5, line 3, delete "mender" and insert therefor --member--.

Column 5, delete Claim 11, lines 1-3, which is a duplicate of claim 10.

Signed and Sealed this

Fifth Day of December, 2006

JON W. DUDAS
*Director of the United States Patent and Trademark Office*